United States Patent [19]
Hooper

[11] Patent Number: 4,966,461
[45] Date of Patent: Oct. 30, 1990

[54] COLOR IDENTIFICATION SYSTEM

[76] Inventor: Donald H. Hooper, 304 Tom Tom St., Chittenango, N.Y. 13037

[21] Appl. No.: 398,641

[22] Filed: Aug. 25, 1989

[51] Int. Cl.$^5$ .............................. G01J 3/51; G01J 3/52
[52] U.S. Cl. ...................... 356/406; 356/423; 356/425; 364/526
[58] Field of Search .............. 356/421, 405, 406, 408, 356/425; 364/526; 434/98

[56] References Cited

U.S. PATENT DOCUMENTS 1,617,024  2/1927  Munsell et al. ...................... 434/98

OTHER PUBLICATIONS

Munsell Color (Brochure)—Date unknown.
Munsell Color—Applications Brochure—date unknown.
Grumbacher Color Compass, 1972.

*Primary Examiner*—Vincent P. McGraw
*Assistant Examiner*—LaCharles P. Keesee
*Attorney, Agent, or Firm*—Wall and Roehrig

[57] ABSTRACT

A hue compass has triplet numerical values assigned to colors so that every possible color is identified with a unique triplet color identification number which represents the percentages of each primary color component present. Triplet values 100/0/0, 0/100/0, and 0/0/100 can be assigned to additive primaries blue-violet, green, and red, respectively. Their complementary colors yellow, magenta, and cyan can be assigned triplets 0/100/100, 100/0/100, and 100/100/0. Likewise, triplet values 100/0/0, 0/100/0 and 0/0/100 can be assigned to subtractive primaries yellow, magenta, and cyan, respectively. Their complementary colors, blueviolet, green, and red can be assigned 0/100/100, 100/0/100, and 100/100/0. A color robot can be employed to assign a triplet value for a given colored test object, whose color can be matched, e.g. by blending appropriate amounts of respective primary color pigments or dyes whose triplet color identification numbers are known.

11 Claims, 6 Drawing Sheets

COLOR IDENTIFICATION SYSTEM

BACKGROUND OF THE INVENTION

This invention relates to a color system and, in particular, is directed to a color system wherein color purity is identified numerically as a percentage of admixtures of colors and is independent of human observations or subjective judgments.

The visible light spectrum is a small part of the electro-magnetic spectrum. The visible spectrum has a wavelength range of about 400 to 700 nanometers. When passed through a prism, white light is dispersed into a continuum of colors. Three of these are considered primary colors. The term "primary color" is used to identify hues which cannot be created by mixtures of any other colors. The additive primary colors are blueviolet, green, and red. (Blueviolet is mistakenly termed "blue" in much of the literature, and most often is hyphenated.)

Light is a physical phenomenon. Those things relating to matter involve chemical phenomena. Depending upon its chemical make-up, matter has the ability to absorb, reflect and/or transmit visible light. When all the components of visible light are absorbed by matter, the object is said to be black. That is, none of the primary components of white light theoretically are either reflected or transmitted by a black object. On the other hand, if all the components of visible light are reflected or transmitted by the object, the object is considered white or clear respectively. When the components of light are absorbed or transmitted in different proportions by an object, color occurs. The color of an object is apparent only when light strikes the object. The object in light has the property of color regardless of it being perceived.

Similarly, for color to be perceived, the viewer must have blueviolet, green, and red receptors. The early work of Newton and others involved with color was postulated on this basis and was later proven by tests conducted by Maxwell and others. The study of color, however, evolved first as an art form and then as a science. Artists and others involved in the use of color decided empirically but incorrectly upon the primary colors and their relationships. They devised a workable system, based on yellow, red, and blue being primary, and therefore assumed it to be valid.

In a publication entitled "*Color Compass*", published by M. Grumbacher, Inc. of New York, N.Y., there is described a color identification system that employs a wheel, wherein the traditional yellow, red and blue are used as primary pigment or dye colors. These presumed primary colors are situated upon a wheel or disk at 120 degree intervals, and secondary and tertiary colors are situated along the wheel or circle between the primary colors. Unfortunately, this system is based on the erroneous assumption that yellow, red and blue are subtractive primary pigments or colors. This erroneous assumption is a widely accepted method of relating and applying colors. However, because the color wheel is based on a misconception of what constitute true primary colors, its use in a practical sense is limited, and oftentimes produces undesirable results.

At about the turn of the last century, Albert H. Munsell arranged colors in a circle, or wheel, and then arranged them in a spherical form. He experimented with various color charts and perfected the Munsell disk as a means for matching and coordinating colors. Later the Munsell Color Company was formed which still carries on his work based on the Munsell system. Although the Munsell system is quite ingenious, it erroneously considers lightness as a component of color, rather than as an independent variable. This, of course, introduces a great deal of subjectivity into the system and again renders it non-usable as an objective means for identifying and/or using color.

In the early decades of this century, the Colorimetry Committee of the Optical Society of America defined color as a sensation produced by the eye, and therefore a purely subjective concept. Later the committee announced that it had adopted a psychophysiological concept that a subjective human response was a necessary part of color per se and its evaluation.

In 1931, the Commission Internationale d'Eclairage (CIE defined the requirements for specific color in terms of magnitudes of three standard stimuli required to match the average visual color response of a young, normal eye. The tri-stimulus values of the three primary colors that are required to match a given color at each wavelength of an equal energy spectrum are used to identify the primary colors. This produces the familiar "color horseshoe." To avoid negative coefficients, the CIE defined a set of non-physical primaries that permitted each color to be specified by a triplet of non-negative numbers. There has been wide use of triplets to identify colors since that time.

OBJECTS AND SUMMARY OF THE INVENTION

It is therefore an object of the present invention to improve systems for identifying colors.

A further object of the present invention is to provide a system for identifying and using colors which is truly objective and free from subjective judgment and human error.

Another object of the present invention is to objectively relate all colors to three primary colors in increments.

Yet another object of the present invention is to provide a system of identifying colors which can be easily computerized.

A still further object of the present invention is to provide a color system that can be readily used in color measurement and design to provide immediate identification of any unknown complex color.

Another object of the present invention is to provide an objective color system based on absolute parameters that can be accurately and repeatedly reproduced without variation, whereby this system can be used in robotic applications and also operate within or outside the visible electro-magnetic spectrum.

A more particular object of the present invention is to permit automatic selection of relative amounts of pigments or dyes that will match the color of an object.

According to an aspect of this invention, a hue (color) compass is produced as a disk or wheel having color sites in degrees, minutes, and seconds of arc disposed about the rim to represent color sites of absolute purity; purities in pigments and dyes being unattainable.

The three primary color sites are located about the disk rim at 120 degree intervals, and secondary color sites to represent the complements of the primary colors are disposed on the disk rim at sites diametrically opposite the associated primary site for the primary color of which it is a complement. Thus the complementary color sites are on the rim at 120° intervals midway between the adjacent, or other two, primary colors. For example, the blueviolet, green and red sites are at 180°, 60°, and 300° respectively, and their complements, the secondaries yellow, magenta, and cyan, are at 0° (360°), 240°, and 120°, respectively. The positioning of the hues is identical on the hue compass, either for additive or subtractive notation. Tertiary color sites, i.e., chartreuse, aquamarine, true blue, violet, crimson, and orange (all but orange being arbitrary terms) are situated at locations equidistant between adjacent primary and secondary color sites.

The hue compass for pigments and dyes, of necessity, requires subtractive color notations. Triplet identification numbers are assigned to each of the color sites on the hue compass to identify the percentage of primary color content for the color in question, which can have any hue (angular position on the hue compass), and represents theoretical purity at the rim. The first subtractive primary site (yellow, at 0°/360°) is assigned the triplet 100/0/0 (Y/M/C). The notation at the same locus on the hue compass designed for additive use is 0/100/100 (BV/G/R). The combined subtractive and additive notation for a given hue always must equal unity, (100/100/100). The triplet represents the percent of each primary. On the subtractive hue compass 100/0/0 indicates that the triplet is fully saturated in the yellow component, but contains no magenta or cyan. On the additive hue compass this same notation 100/0/0 indicates that the triplet is fully saturated in the blueviolet component, but contains no green or red. Other color components are similarly identified as triplets giving the percentage of primaries present in composition. Subtractive primary color sites are assigned triplet identification numbers of 100/0/0 for yellow, 0/100/0 for magenta, and 0/0/100 for cyan. Additive primary color sites are assigned 100/0/0 for blueviolet 0/100/0 for green and 0/0/100 for red. Secondary, or complementary, color sites bear triplet color identification numbers such that the triplet sum of a primary component and its complement (diametrically opposite on the disk) will be 100/100/100. Tertiary color sites on the rim are assigned identification numbers where one component is 100% and another is 0% and the third component is between 100% and 0% For example, an orange triplet identification number, for the site midway between yellow and red at 330° would be 100/50/0 subtractively, and 0/50/100 additively. The theoretical purity (maximum saturation) of any component can never exceed 100% so these triplet identification numbers along the rim are always normalized to 100%. Also, the triplet number for the tertiary complementary colors situated opposite one another will combine to a triplet sum 100/100/100, for example, additive orange (0/50/100) and its complement true blue (100/50/0) add to 100/100/100, white, and subtractive orange 100/50/0 and its complement true blue 0/50/100 add to 100/100/100, black.

These color identification numbers can be applied objectively and automatically. In an automatic color analysis system, a color robot analyzes the light reflected from an object whose color is to be matched. The robot takes successive readings through three interference, non-gaussian primary color filters (i.e., blueviolet, green, and red) and provides percentage values for each primary color which are percentages of the value that would result if the incident light had been reflected from a white object. These values are then processed in a digital processor which computes the triplet number that identifies the color of the test object.

The triplet numbers for pigments or dyes, which have bee previously measured, are stored in a memory associated with the digital processor. Ideally only three pigments or dyes are needed, i.e., substantially pure yellow, cyan, and magenta, for which any other color can be mixed. In reality any pigment or dye has components of all three subtractive primary colors present, i.e., there is at least a small amount of cyan and magenta present in any yellow pigment or dye, and in the case of cyan, there is usually a greater amount of magenta and some yellow present. Magenta contains a moderate amount of yellow and cyan. The digital processor will calculate the amount of each dye needed to produce a mixture with the same triplet number as the test object, or as close to it as practicable.

This permits a color match to be made in a single step, without need for numerous test batches, and without subjective human judgment. This also permits any color to be matched with only three starting pigments (i.e., yellow, magenta and cyan) instead of the numerous colors that are employed in conventional formulations. Of course, as many pigments can be used as desired, because the digital processor can track the three color components of all of any number of pigments or dyes, and select an optimal blend. This permits substitution of a less expensive pigment or dye where the test object color to be matched is not especially critical.

The above and many other objects, features and advantages of this invention will become evident to those of skill in the art from the ensuing description of a preferred embodiment, which should be read in connection with the accompanying Drawing.

DETAILED DESCRIPTION OF A PREFERRED EMBODIMENT

Figure 1:
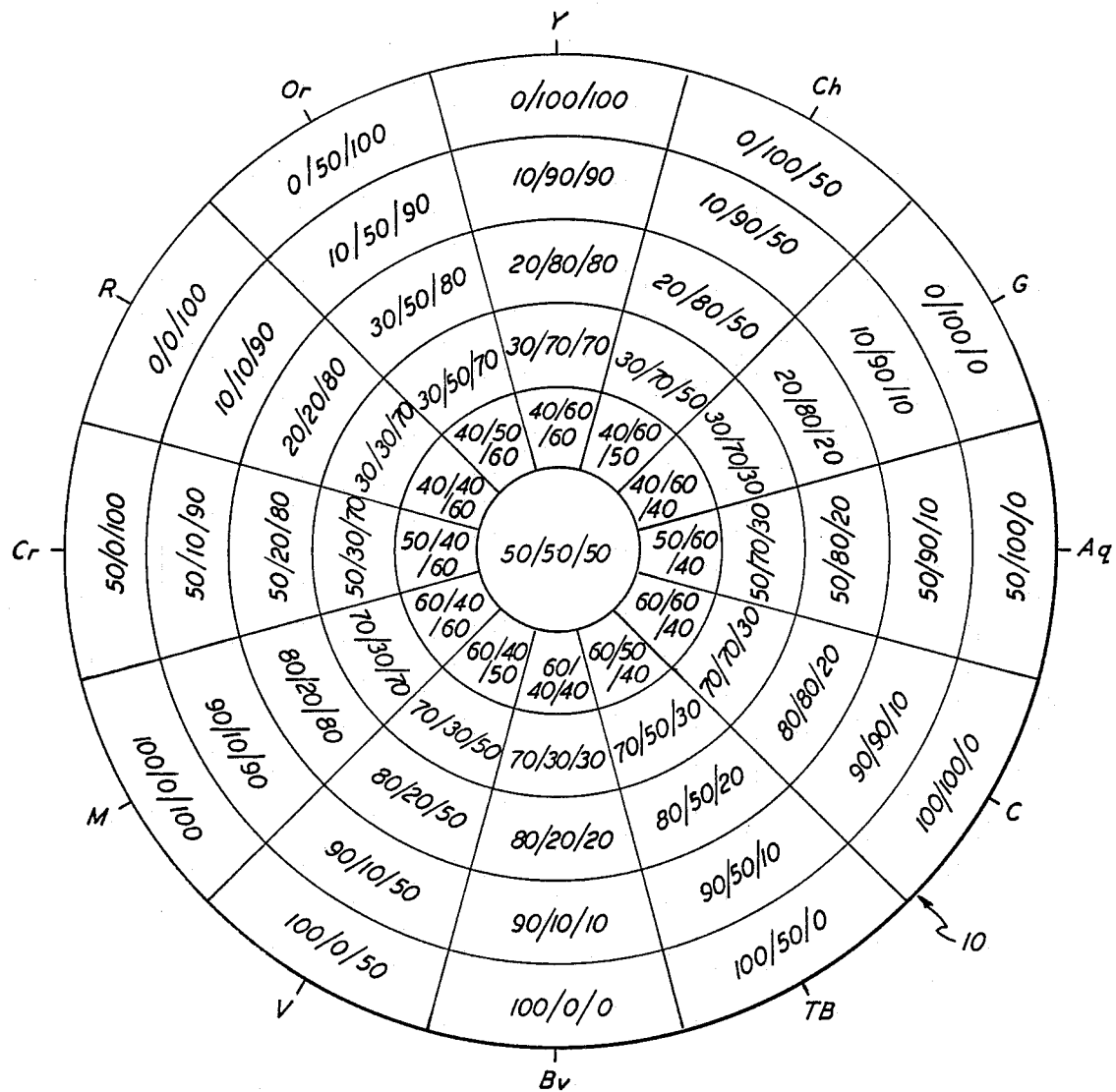
FIG. 1 and 2 are color charts for explaining the basic principles of this invention in terms of additive primary colors and subtractive primary colors, respectively.

With reference to the several figures of Drawings, and initially to FIG. 1 thereof, a color chart 10 is set out as segments of a cone in which primary colors blueviolet Bv, green G, and red R are positioned at stations along the rim situated 120 degrees apart. These primaries, numerically, are considered pure hues at these positions and contain only blueviolet, green, or red respectively. Accordingly, these are assigned Bv/G/R color identification triplets 100/0/0, 0/100/0, and 0/0/100 respectively. Directly opposite on the disk, and midway between the stations for the other two primary colors, are secondary color stations for secondary or complementary colors yellow Y, magenta M, and cyan C, which additively are assigned color identification triplet numbers 0/100/100, 100/0/100, and 100/100/0, respectively. A triplet sum for any primary color and its complement e.g., Bv and Y, which is the triplet formed by adding the respective Bv, G and R components, is always 100/100/100 which is the triplet assigned to white light.

Between each primary color station and the adjacent secondary color stations are six tertiary color stations, e.g., chartreuse Ch, aquamarine Aq, true blue Tb, violet Vi, crimson Cr, and orange Or. Each of these has a color identification triplet which is an average of the neighboring primary and secondary color identification triplet numbers. For example, for additive orange Or, the triplet is half the triplet sum of the triplet numbers for red R, and yellow Y. That is, 0/0/100 (for red) plus 0/100/100 (for yellow) produces a triplet sum of 100/0/200. This is divided by two to yield the triplet 0/50/100

It should be noted that the colors on the rim are numerically pure hues, and contain one or two primary components, but always lack any of the third component. Thus, at all stations, the triplet will have one value at 100 percent, one value at 0 percent, and one value between 0% and 100%

In a color disk, outer or pure-hue sites have the values assigned as on the compass and a center, or medium neutral gray site, is assigned a triplet 50/50/50, which represents equal amounts of each primary component. Tints, tones, and shades are represented by combinations of three percentage values in the triplet, so that browns, other earth tones, in fact, every possible color, is uniquely identified with a triplet identification number.

At stations within the outer ring are represented colors which contain at least some of all three components, with the colors being less and less pure as the position nears the center of the disk. A center neutral gray position is assigned a color identification triplet 50/50/50, which means the color components of neutral gray are equal parts of all primary colors BV, G and R at a fifty-percent value, and also equal parts of white and black. This color gray is obtained by blending equal parts of any color and its complement which is disposed 180° away on the disk and at an equal radius from the center, i.e., green plus magenta, orange plus true blue, crimson plus aquamarine, etc.

The colors that surround neutral gray but do not extend to the rim i.e. which have varying percentages of the complementary color, are considered tones, i.e. browns or other muted or subdued colors.

All possible colors can also be expressed in terms of the subtractive primary colors, to wit, yellow Y, magenta M and cyan C. In theory all colors can be synthesized by reflecting white light from an object that is pigmented with yellow, magenta and cyan pigments or dyes in ranges of zero to one hundred percent. Here one hundred percent purity of a color would mean absorbing all of the light that is complementary to that color. For example, in a perfect system a 100% magenta pigment or dye would absorb all the green light but reflect all the other components (namely blueviolet and red) that are incident upon it while a 0% value absorbance of each light primary would reflect all the white light as white light.

Figure 2:
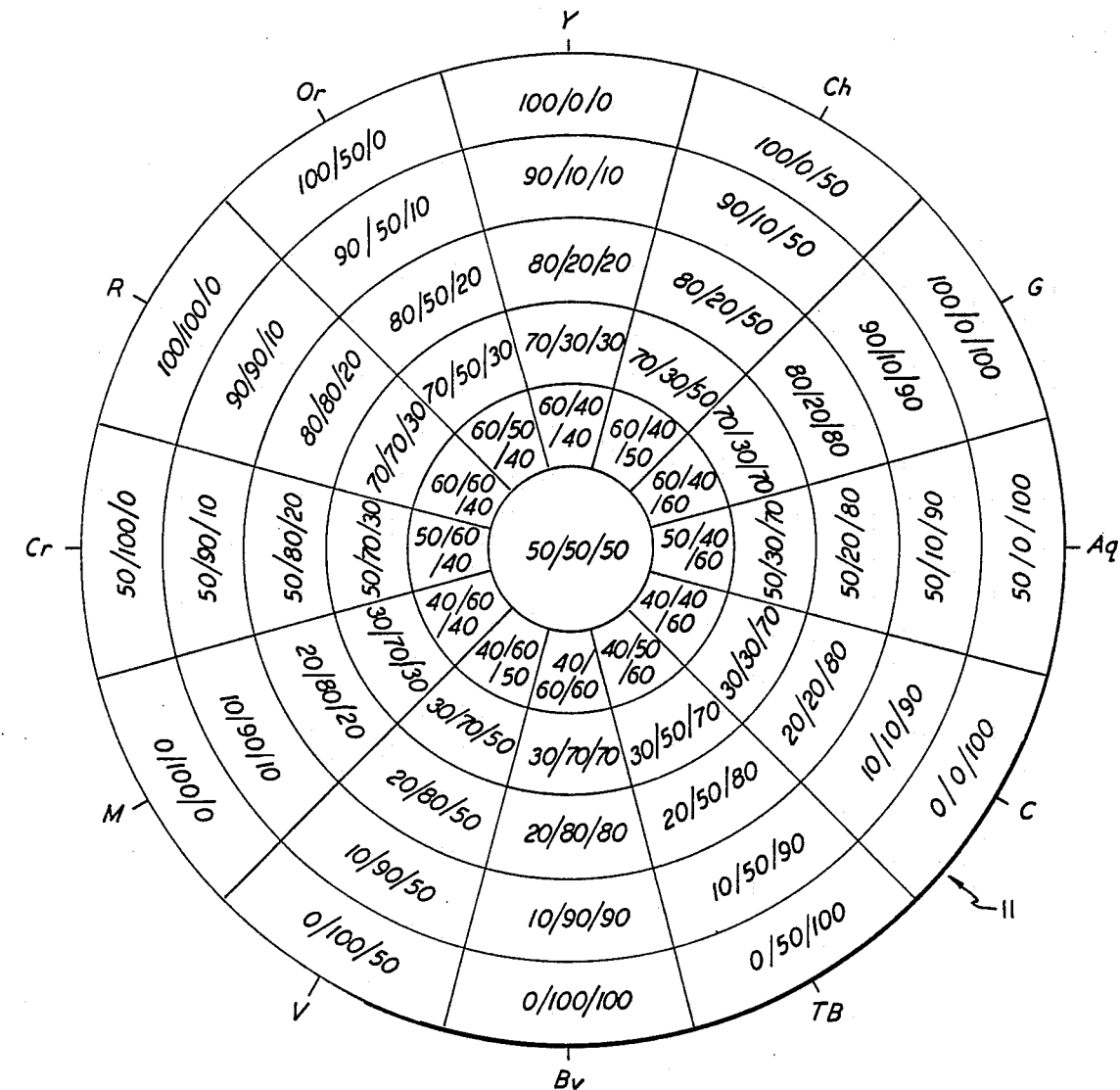

As shown in FIG. 2, a subtractive color chart 11 is substantially identical to the additive color chart 10 of FIG. 1 except the color identification triplets are expressed Y/M/C, i.e., in terms of the subtractive primaries yellow Y, magenta M, and cyan C. The primaries are at stations on the rim disposed at 120 degree spacings, with their complementary color stations, namely blueviolet Bv, green G, and red R stations being disposed diametrically opposite them and midway between the stations for the other two primary colors. Tertiary colors, to wit, chartreuse, aquamarine, true blue, violet, crimson, and orange are disposed between neighboring primary and secondary stations, as in the color chart 10 of FIG. 1. Color identification numbers assigned for each color are complementary to those assigned to the same position in the additive chart, so that the triplet sum of the additive triplet and subtractive triplet for the same color is 100/100/100.

The central location corresponding to neutral gray is assigned 50/50/50, and the muted tone colors are assigned triplets that are between the gray triplet value and the pure hue triplet value.

Figure 3:
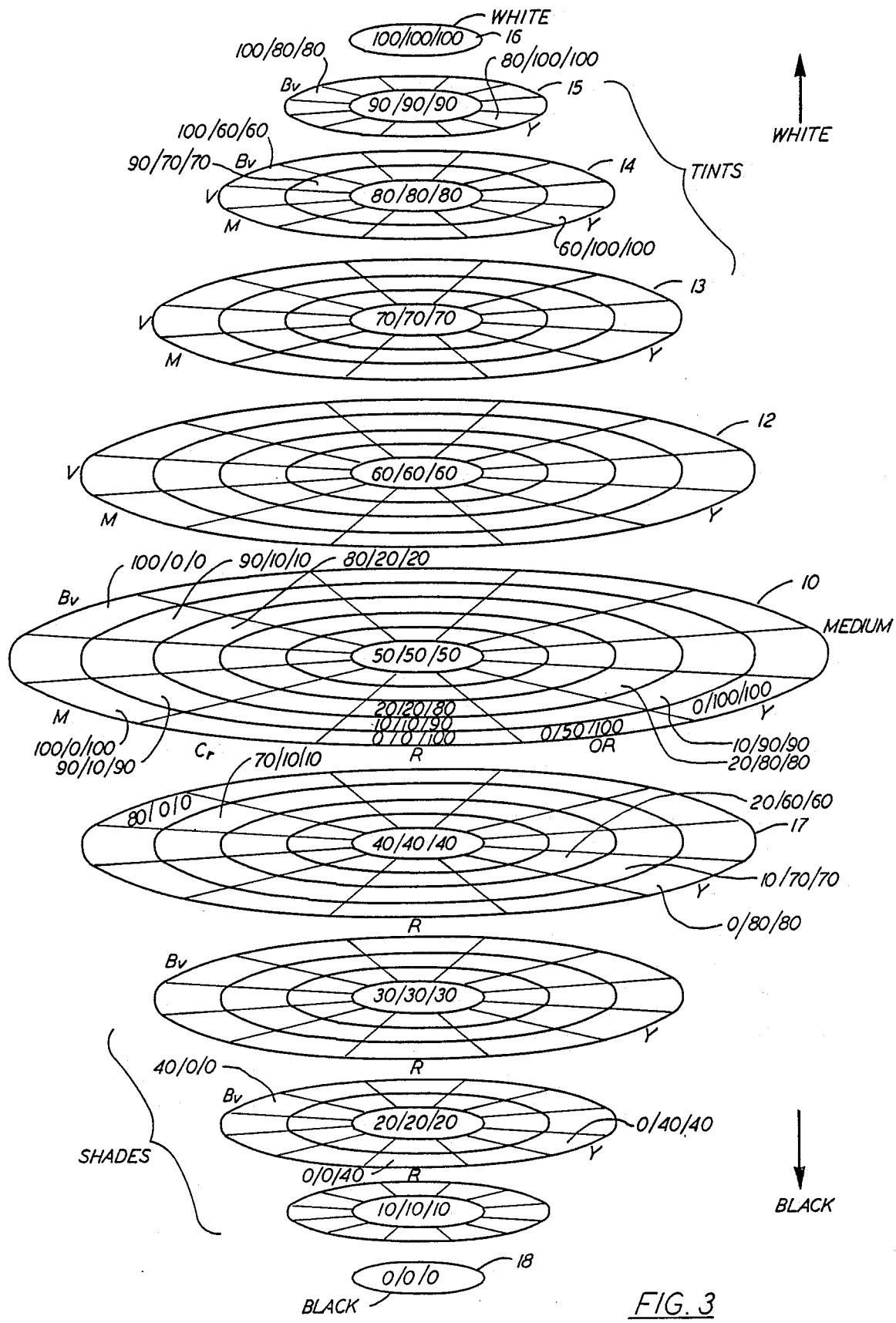
FIG. 3 and 3A, respectively, show slices of an additive and a subtractive color double-cone chart system for explaining this invention in terms of various tints, tones, and shades of colors, to which triplet identification numbers are assigned.
Figure 3A:
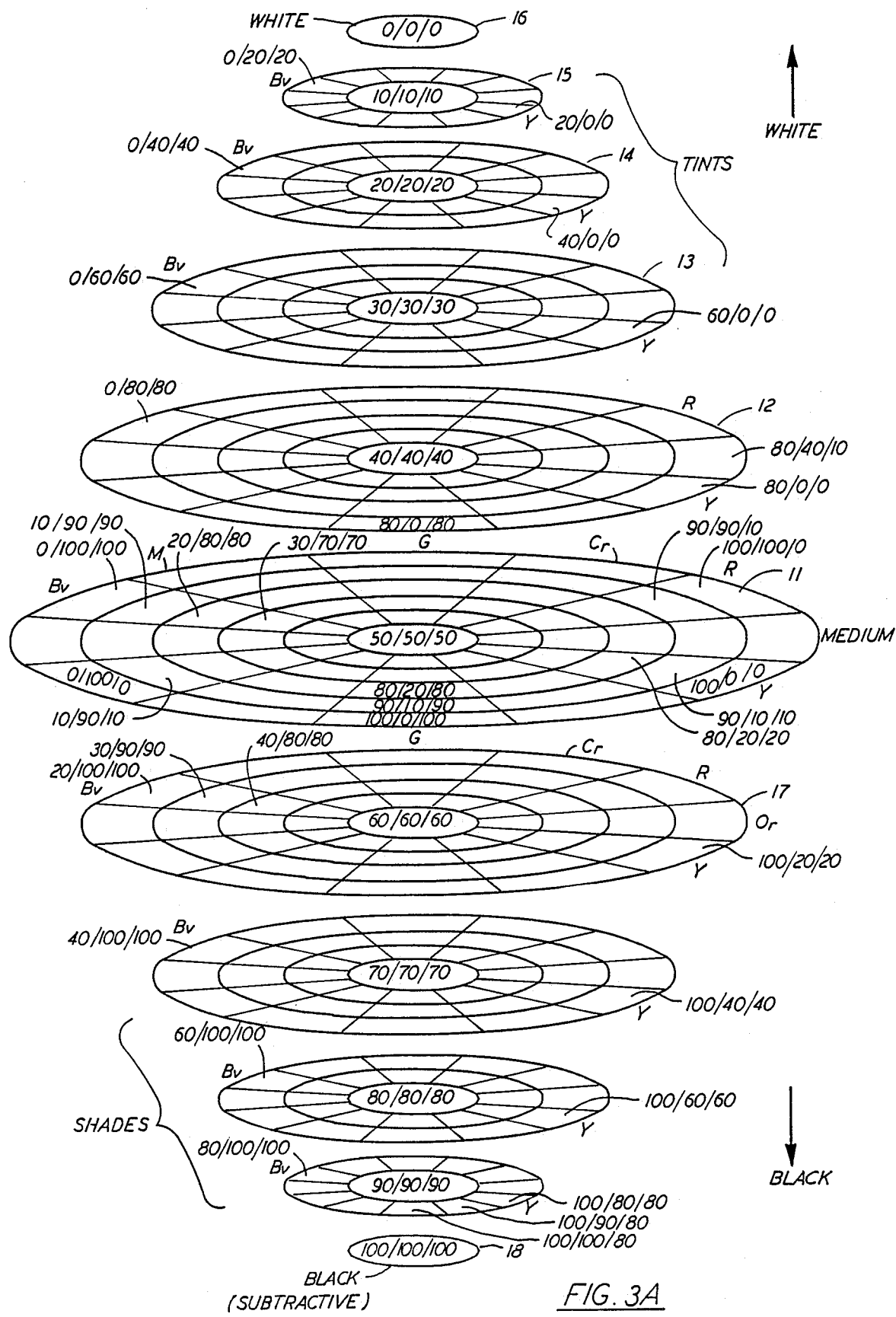

The colors represented in the above two disks 10 and 11 are considered to be medium value colors, that is, with equal amounts of black and white being mixed in. To incorporate all values between black and white, including the dark shades (e.g. maroon and navy blue) the light tints (e.g. pale yellow, pink, sky blue, etc.) requires a three-dimensional chart. There, color space can be in the form of a pair of cones that meet at their bases, with an upper apex being white, the lower apex being black and the common central base being the color chart 10. FIG. 3 is an additive cone; FIG. 3A is a subtractive cone. FIG. 3 shows selected horizontal slices from such a color cone. Here, the cone sections 12 to 16 of increasing lightness as can be indicated by their respective central neutral positions. The disk 10 has a neutral gray triplet 50/50/50. The color charts 12 to 15 have progressively lighter gray value triplets at the core, namely 60/60/60, 70/70/70/, 80/80/80, and 90/90/90. The apex 16 has a triplet 100/100/100 for pure white, meaning that, in theory, all the white light components are radiated, transmitted or reflected, i.e. one hundred percent of each of blueviolet, green, and red. The outer rings of these are limited in their triplet components to 100 percent of any primary component, while the other components are always greater than zero and less than 100 and in fact are at least a percentage equal to one hundred percent less the difference between the central gray component value and one hundred percent. For example, as shown in color chart 15 in FIG. 3, the outermost blue-violet tint has a triplet 100/80/80 and its complement yellow tint has a triplet 80/100/100. The darker colors, that is, shades, are represented in conic slices 17 to 18 below the color chart 10. The triplet values of their central neutral zones decrease from 50/50/50 to 40/40/40 and thence down to 0/0/0 to represent darker and darker grays and finally black. Shades of an identifiable hue are represented at stations away from the axis of the slices, where the triplets indicate that some, but always less than 100% of all primary colors are reflected by the object.

Figure 4:
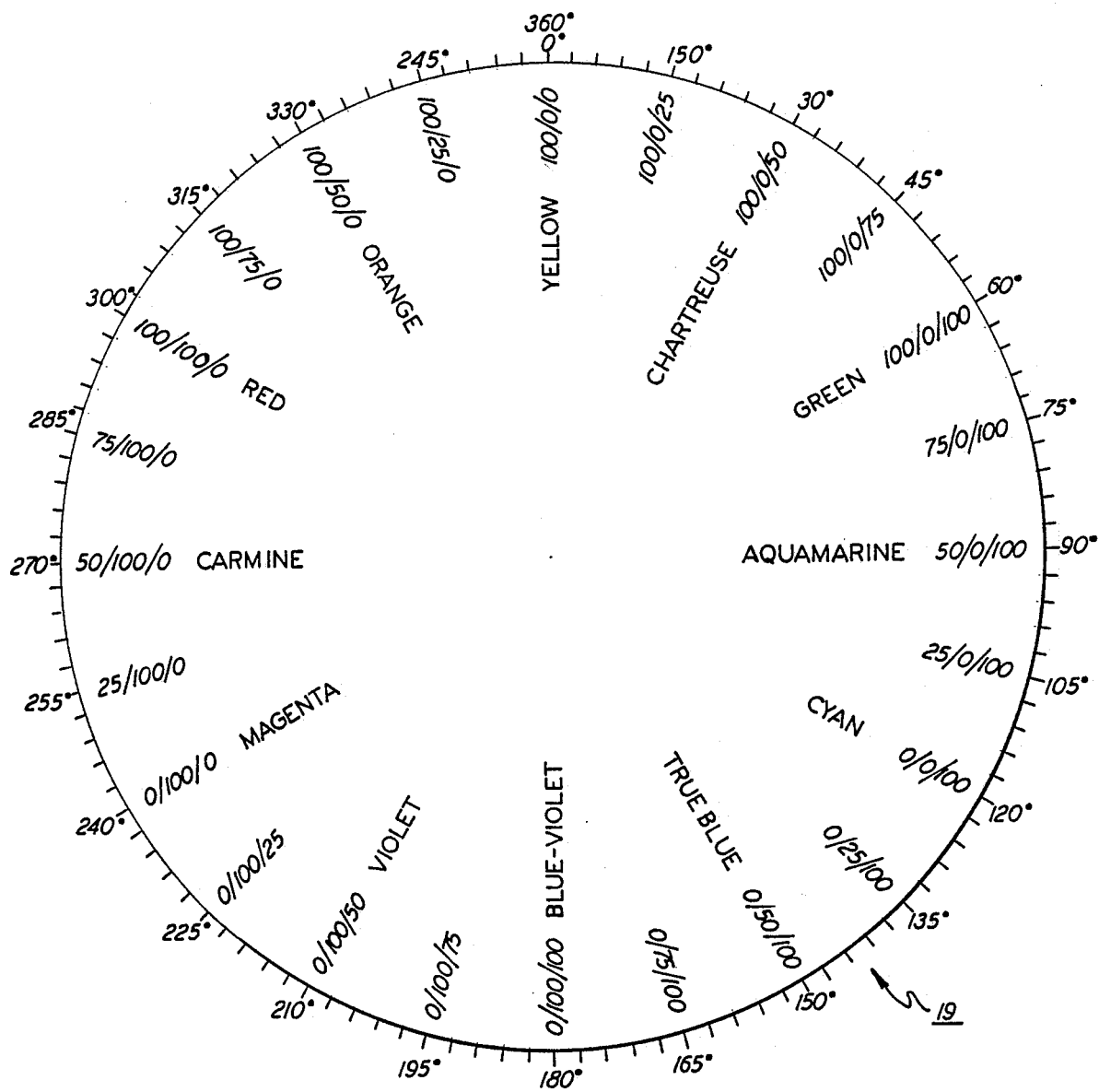
FIG. 4 is a subtractive hue compass according to this invention.

Any color can be identified in terms of its hue as shown with reference to the hue compass 19 of FIG. 4. This hue compass employs subtractive primary identification triplets Y/M/C with successive triplets in this case occurring at three-degree intervals around the rim of the compass. As in the color chart 11 of FIG. 2, subtractive primaries yellow Y, Magenta M, and cyan C, are positioned at 360°, 240°, and 120°, and their complements blueviolet Bv, green G, red R, are at 180°, 60° and 300°, respectively. Tertiary colors are situated at the intermediate 30 degree intervals between adjacent primaries and secondaries, more specifically with chartreuse, aquamarine, true blue, violet, crimson and orange at 30°, 90°, 150°, 210°, 270°, and 330°, respectively. At the rim, the triplets represent maximum purity hues, which contains, theoretically, 100% of one primary, an amount between 0% and 100% of a second primary, and 0% of a third primary color.

The hue of any color that includes a non-pure color, such as a tint, tone, or shade, can be expressed in terms of its hue. This involves subtracting out the neutral gray component of the triplet and then normalizing the remaining triplet so that the maximum primary component is 100%. For example, if a brown tone is considered and its primary color components are measured, it may have a Y/M/C triplet value of 60/32/25. There is a neutral gray component included here of 25/25/25. If this gray component is subtracted from the brown triplet, the resulting hue has a triplet 35/7/0. This is normalized to a 100% value by multiplying each term by 100/35 (or 20/7) to yield a triplet 100/20/0. This hue appears at 348 degrees on the compass 19, and is about two-fifths of the angular distance from yellow to orange.

While these hues at 3 degree intervals are not very difficult for the human eye to distinguish, they can be obtained in any percentage increment using a color robot (modified densitometer) to measure the amount of each primary color present in a colored object if pure white light is incident upon the object. Obtaining the hues in this manner can simplify matching the test object color, and can also simplify coordinating that color with contrasting colors which can be complementary, split-complementary, triadic or analogous tints, tones, or shades of color harmony.

Figure 5:
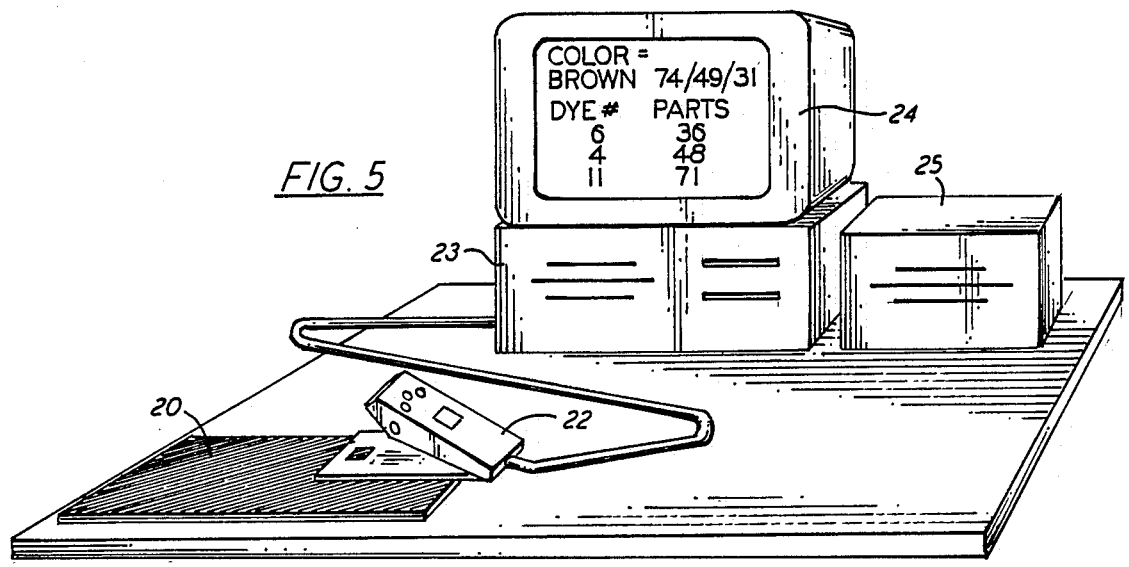
FIG. 5 is a schematic perspective view of color identification apparatus according to one preferred embodiment of this invention.

Apparatus to identify the color of a test object 20 such as a paint swatch or chip, can be explained with reference to FIG. 5. That is, this color identification apparatus can identify the color of the object in terms of the percentages of its primary components, and assign it a unique identification triplet code or number. A color robot 22, which excludes all ambient light and having its own internal stable light source, has three primary color filters, namely a blueviolet filter, a green filter, and a red filter. These filters each pass only the respective portions of the visible spectrum. Blueviolet, green, and red readings are taken in sequence. This robot is adapted to have the attributes of a percent-dot-area-densitometer converting optical density from percent reflectance to percent dot area, and thus percent colorant produces respective percent-colorant output values to represent the amount of each primary color received from the object as compared with the amount that would have been reflected from a white object. These three values can be obtained with an accuracy to within about one-half of one percent or better. The blueviolet, green, and red percentage values are provided by the robot 22 and/or to a computer or other digital processor 23, and the color identification triplet as well as the hue compass coordinate and other data can be displayed on the robot or on a monitor 24.

A memory device 25 is associated with the processor 23 and stores color information for a number of pigments or dyes that regardless of their impurity can be mixed in appropriate proportions to match the color of the test object 20.

Figure 4A:
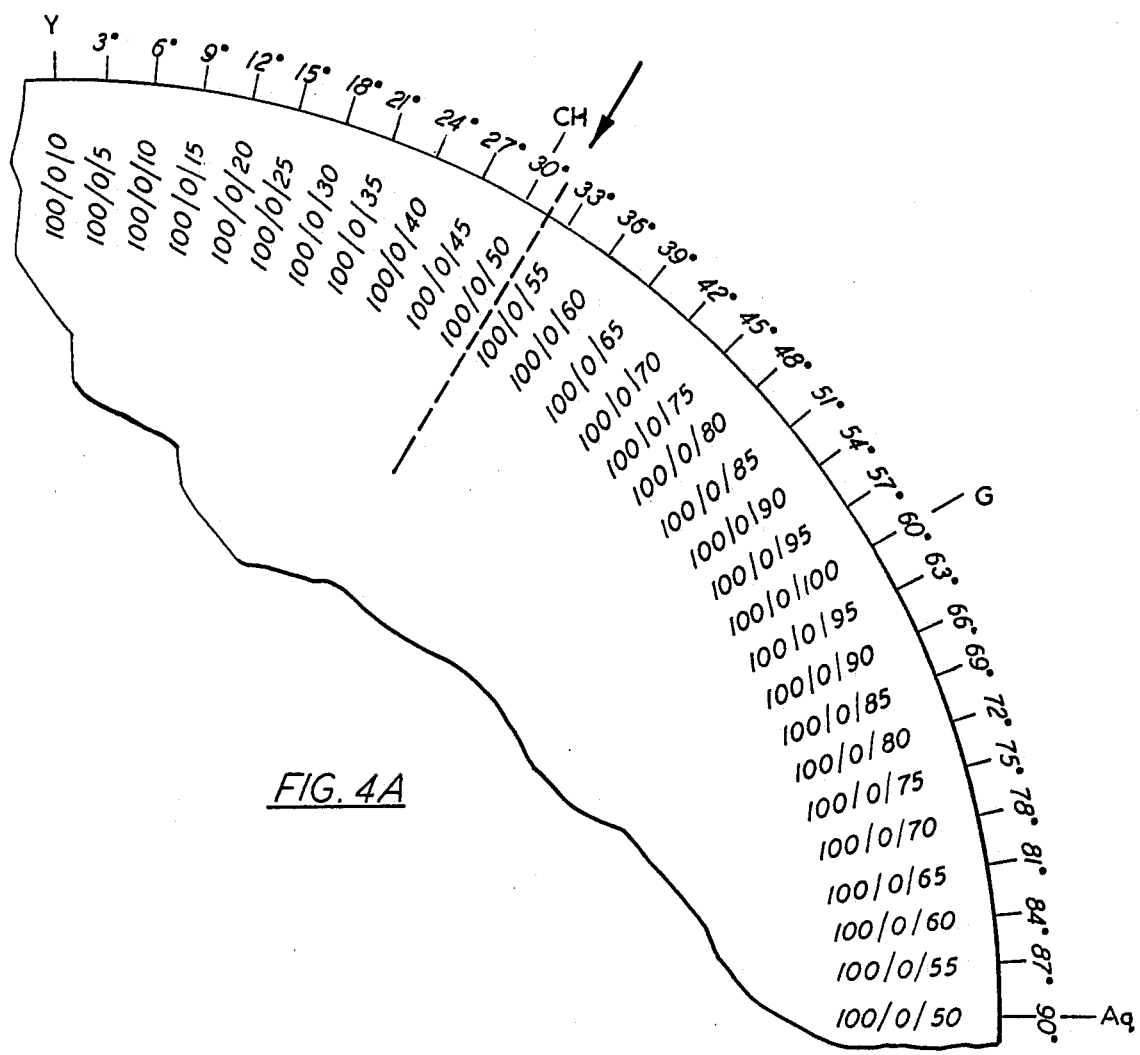
FIG. 4A is an enlargement of a portion of the subtractive hue compass.

In this example the test object is found to have a color whose identifying triplet is 20/54/36, in terms of the percent of additive primaries BV, G, R. The subtractive primary triplet Y/M/C can be obtained by subtracting the additive components each from 100% to give the percentage triplet 80/46/64. In this case the color is chartreuse, slightly shifted towards green, and considerably neutralized with gray. Its hue-compass locus is 31° 30' 0", positioned to the nearest 2 ½ degrees of a arrow on FIG. 4A).

Now, for example, there are data stored concerning the yellow, magenta, and cyan pigments or dyes in use, including their respective color triplets Y/M/C. As a general matter, it is especially difficult to produce cyan and magenta pigments or dyes of great purity, while yellow can be rather pure in hue, although there is some adulteration present. In this example, the three pigments or dyes in use have the following triplet identification numbers showing the percentages of their constituent parts:

Y/M/C

|  | | Y/M/C | | |
|---|---|---|---|---|
| Yellow dye | — | 97/02/01 | = | 100% |
| Magenta dye | — | 03/92/05 | = | 100% |
| Cyan dye | — | 10/12/78 | = | 100% |

These are to be blended so that the total yellow, magenta, and cyan contribution all three pigments or dyes will be 80%, 46%, and 64% respectively.

Beginning with cyan, and treating yellow last, the computer or processor selects proportional parts of the three dyes so that the required total of each primary color is obtained. This can be done by any of a number of straightforward algorithms.

Using a matrix algebra algorithm where $$A = \begin{vmatrix} 97 & 03 & 10 \\ 02 & 92 & 12 \\ 01 & 05 & 78 \end{vmatrix} \quad C = \begin{vmatrix} 80 \\ 46 \\ 64 \end{vmatrix} \quad W = \begin{vmatrix} X \\ Y \\ Z \end{vmatrix} \text{ and } A \times W = C$$

and solving for W where X, Y, and Z are the dye proportions to be mixed to obtain the desired colors;

The yellow pigment or dye is contributing $$\frac{71}{80},$$

or 88.75% of the yellow total required.
The magenta pigment or dye is contributing $$\frac{1.1}{80},$$

or 1.375% of the yellow total required.
The cyan pigment or dye is contributing $$\frac{7.9}{80},$$

or 9.875% of the yellow total required.
The yellow pigment or dye is contributing $$\frac{1.5}{46},$$

or 3.3% of the magenta total required.

The magenta pigment or dye is contributing $$\frac{35.1}{46},$$

or 76.3% of the magenta total required.
The cyan pigment or dye is contributing $$\frac{9.4}{46}, \text{ or } \frac{20.4\%}{100\%}$$

of the magenta total required.
The yellow pigment or dye is contributing $$\frac{0.7}{64},$$

or 1.1% of the cyan total required.
The magenta pigment or dye is contributing $$\frac{1.9}{64},$$

or 3% of the cyan total required.
The cyan pigment or dye is contributing $$\frac{61.4}{64}, \text{ or } \frac{95.9\%}{100\%}$$

of the cyan total required.

Here, 78.7 parts of the cyan dye or a pigment provides a triplet contribution of 7.9/9.4/61.4; 38.1 parts of the Magenta dye or pigment provides a triplet contribution of 1.1/35.1/1.9; and 73.2 parts of the yellow pigment or dye will provide a triplet contribution of 71.0/1.5/0.7. These three total by triplet addition

| Y | M | C | |
|---|---|---|---|
| 7.9 | 9.4 | 61.4 | |
| 1.1 | 35.1 | 1.9 | |
| 71.0 | 1.5 | 0.7 | |
| 80.0 | 46.0 | 64.0 | = Total percentage required. |

This combination of the pigments or dyes in use in this formulation precisely matches the color of the test object 20. The color is matched in one attempt and using only the three primary pigments or dyes at hand, as above.

An added additive advantage of this system is that many pigments or dyes can have their data stored and processed, and less expensive mixtures of dyes and pigments can be employed where cost is a consideration. It should be remembered that the more pure dyes and pigments can be very expensive, and it is possible for the computer to find an acceptable match with a mixture of lower quality, hence less expensive pigments or dyes.

It is also possible to incorporate the digital processor and storage device into the robot 22 using available integrated microcircuits. A display could be incorporated into the housing of the robot avoiding the need for the monitor 24.

Numerous other automated color control applications are possible, which would remove the subjective human factor from identification, analysis and matching of colors.

While the invention has been described in detail hereinabove with reference to a preferred embodiment, it should be recognized that the invention is not limited only to that embodiment. Rather, many modifications and variations would present themselves to those skilled in the art without departure from the scope and spirit of this invention, as defined in the appended claims.

What is claimed is:

1. A method of constructing a hue compass for objectively identifying any particular color with regard to its primary color content that includes the steps of
    locating a sequence of spaced color sites about the rim of a hue compass;
    positioning three primary colors at sites located about said disk compass which are at 120 degree intervals;
    locating respective secondary color sites for colors that are complements of said primary colors at stations diametrically opposite the associated said complementary primary color sites whereby each said secondary color site is situated midway between the remaining two primary color sites on the rim;
    assigning a triplet color identification number to each primary and secondary color site identifying relating to its percentage primary color content so that said first primary color site is identified 100/0/0, said second primary color is identified 0/100/0, and said third primary color site is identified 0/0/100 and the triplet sum of a primary color site identification number and its complementary secondary color site triplet identification number always equals 100/100/100;
    locating tertiary colors at sites equidistant between said primary color sites and the neighboring secondary color sites on the rim and assigning each tertiary color site a triplet color identification number that is an average of the adjacent primary and secondary color site triplet identification numbers whereby the sum of any two triplet identification numbers relating to color sites that are situated opposite each other on the rim of the compass equals 100/100/100.

2. The method of claim 1 that includes the step of further subdividing the circle between each tertiary color site and the neighboring primary or secondary color sites into spaced sites, each site representing an intermediate hue that is an admixture of the two colors adjacent and equidistant thereto and assigning a triplet color identification number to each said intermediate color that is an average of the color identification numbers of its adjacent color sites.

3. The method of claim 2 that includes the further step of joining opposed color sites positioned about the circle with diametrically aligned sets of color tone sites so that all such sets commonly share a center neutral site at the center of the hue compass, identifying the center neutral site with a triplet identification number 50/50/50 which represents medium neutral gray, and assigning a triplet color identification number to each color tone site in each color tone site that is an average of the triplet identification numbers of adjacent sites in said diametrically aligned set.

4. The method of claim 1 wherein for subtractive color synthesis the first primary color is yellow, the second primary color is magenta and the third primary color is cyan.

5. The method of claim 1 wherein for additive color synthesis the first primary color is blueviolet, the second primary color is green, and the third primary color is red.

6. A color chart for identifying a particular color with regard to its primary color content and which comprises a disk having a sequence of spaced color sites situated about its rim, with three primary color sites representing the three primary colors at 120 degree intervals about the rim, respective secondary color sites representing colors that are complements of said primary colors at sites diametrically opposite the associated complementary primary color sites whereby each said secondary color site is situated midway between the remaining two primary color sites on the rim, and tertiary color sites equidistant between said primary color sites and the neighboring secondary color sites on the rim of the disk between each tertiary color site and the neighboring primary or secondary sites each said further color site representing an intermediate hue that is an admixture of the two colors represented at sites adjacent and equidistant thereto; said primary, secondary, tertiary, and further color sites bearing a triplet color identification number relating to its percentage of primary color content so that the first, second, and third of the primary color sites are identified 100/0/0, 0/100/0 and 0/0/100, the first, second, and third of the complementary, secondary color sites have triplet identification numbers 0/100/100, 100/0/100, and 100/100/0, so that the triplet sum of any primary color site identification number and its complementary secondary color site identification number is always 100/100/100; said tertiary color sites each have a triplet color identification number that is an average of the adjacent primary and secondary color site triplet identification numbers whereby the sum of any two triplet identification numbers relating to the color sites that are situated diametrically opposite each other on the rim of the disk equals 100/100/100; and each said further color site has a triplet color identification number that is an average of the triplet color identification numbers of its equidistant adjacent color sites.

7. The color chart of claim 6 further including diametrically aligned sets of color tone sites that join diametrically opposed color sites on the rim of the disk, such that all such sets commonly share a neutral site at the center of the color chart, said neutral site bearing a triplet color identification number 50/50/50 to represent neutral gray, said color tone sites having triplet identification number that is an average of the triplet identification numbers of the equidistant tone sites adjacent thereto in said diametrically aligned set.

8. A color identification apparatus for automatically sensing the primary color components of an object and assigning triplet color identification numbers to uniquely identify the objects color in terms of the percentage value of each primary components wherein 100 represents full saturation of the components and 0 represents an absence of that component, with the triplet color identification numbers 100/0/0, 0/100/0, and 0/0/100 representing the primary components, and with 0/100/100, 100/0/100, and 100/100/0 representing respective complementary components, such that the triplet sum of any primary components and its complementary components, equals 100/100/100; and wherein other colors that are composed of one, two, or all three components are represented by triplets, $N_1/N_2/N_3$ where $N_1$, $N_2$, and $N_3$ are percentage values between 0% and 100%, whereby a neutral gray color value has the triplet number 50/50/50; the apparatus comprising:
  a source of white light illumination impingent upon said object;
  a color robot having first, second, and third primary color filters which are selectively interposed between the illuminated object and a sensor device in the color robot, and including means for providing an output value for each said primary color that is a percentage of the primary color light absorbed by the object; and
  a digital processing device which receives the output values from said color robot and computes the respective triplet color identification number therefor.

9. The color identification apparatus according to claim 8 wherein said digital processing device further includes storage means in which are stored pigment or dye triplet color identification values for a plurality of color pigments or dyes whose respective colors consist of a principal primary color component and lesser amounts of the remaining primary color components; and means for computing the amounts of said pigments or dyes blended to approximate most closely the color of said object by determining the amounts of said pigments or dyes which are needed so that the triplet sums of their respective pigment triplet color identification values would most nearly equal the triplet identification number of the color of the object.

10. The color identification apparatus according to claim 8 wherein said primary color filters are blueviolet, green, and red filters respectively.

11. The color identification apparatus according to claim 8 wherein said primary color components are expressed in percentages of yellow, magenta, and cyan.

* * * * *